Figure 12:
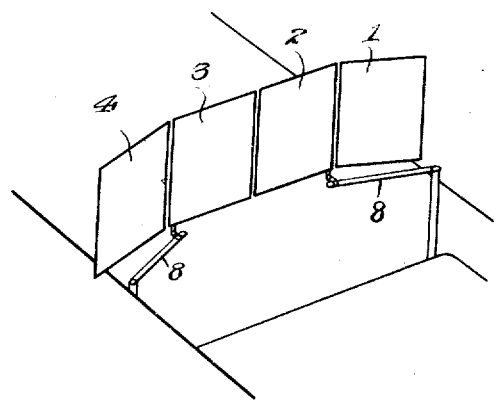

C. H. FRYER.
WIND SHIELD FOR AUTOMOBILES AND OTHER PASSENGER VEHICLES.
APPLICATION FILED OCT. 16, 1916.
1,274,869.
Patented Aug. 6, 1918.
4 SHEETS—SHEET 1.
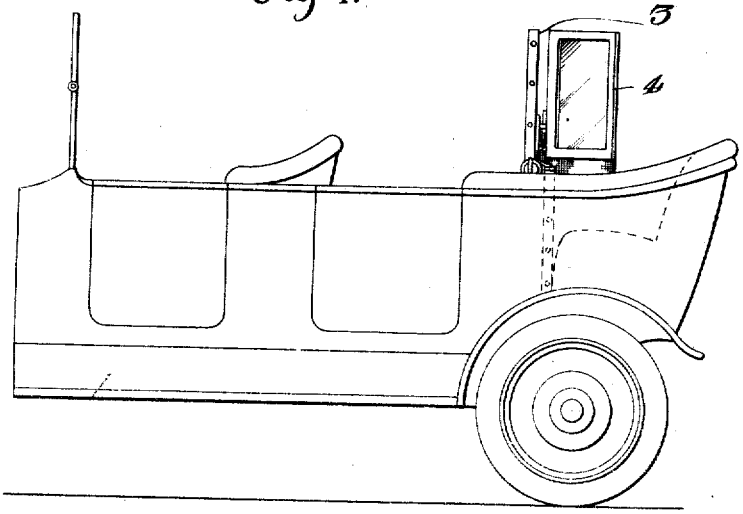
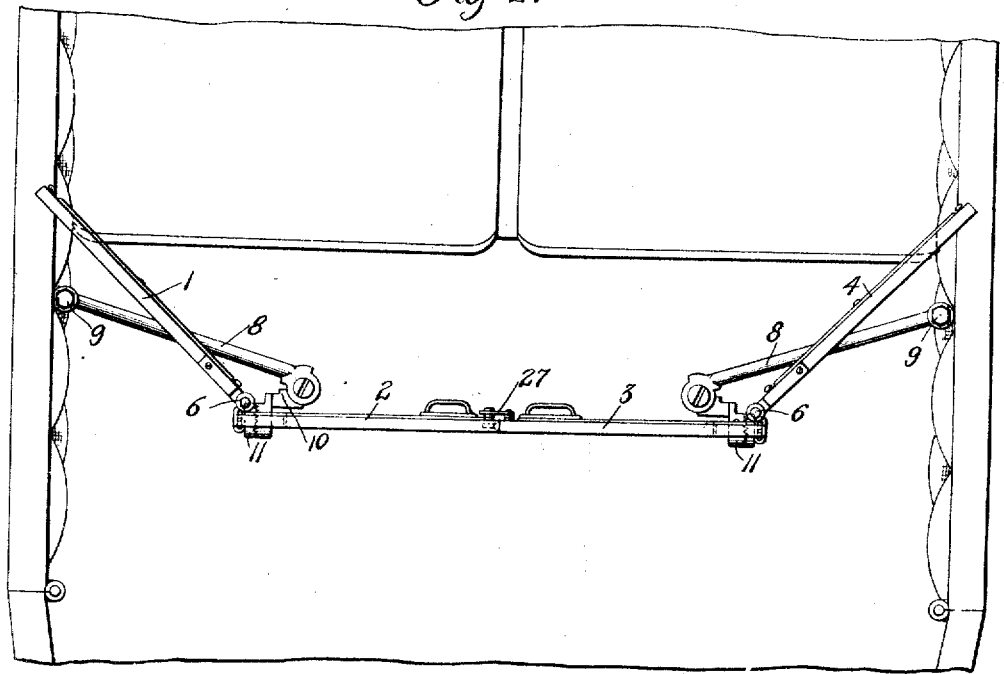
INVENTOR
Charles H Fryer
BY
Sheffield & Betts
ATTORNEYS C. H. FRYER.
WIND SHIELD FOR AUTOMOBILES AND OTHER PASSENGER VEHICLES.
APPLICATION FILED OCT. 16, 1916.
1,274,869.
Patented Aug. 6, 1918.
4 SHEETS—SHEET 2.
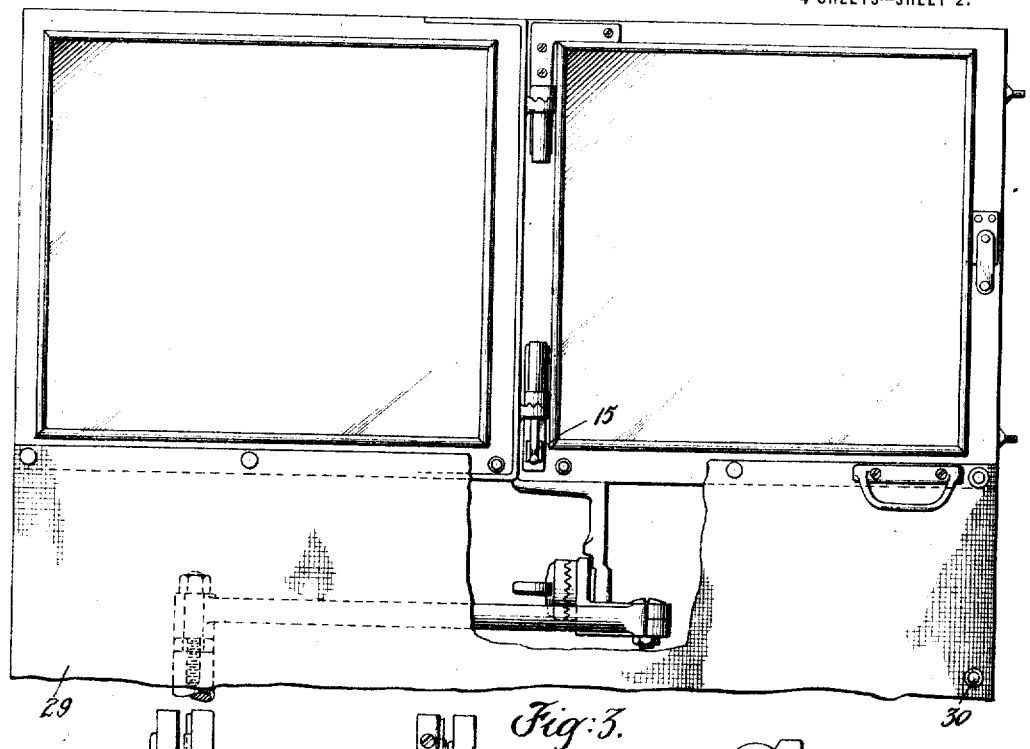
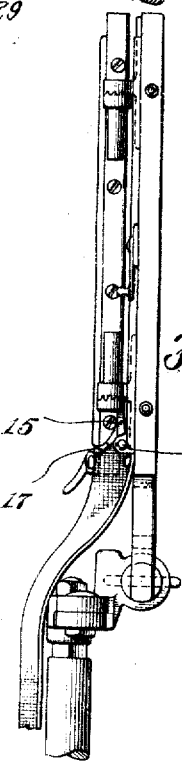
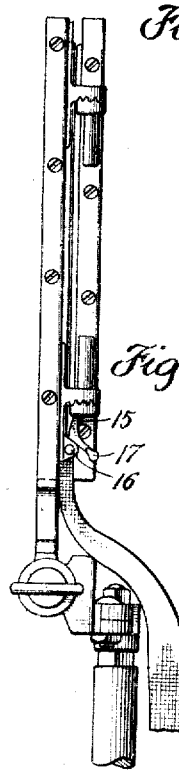
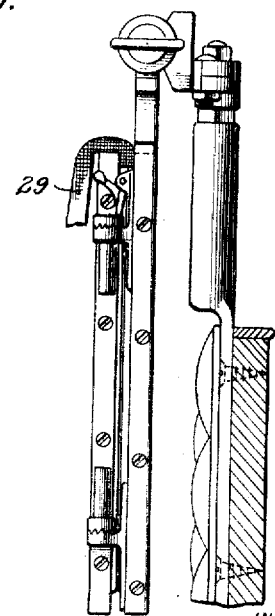
INVENTOR
Charles H Fryer
BY
Sheppard & Betts
ATTORNEYS

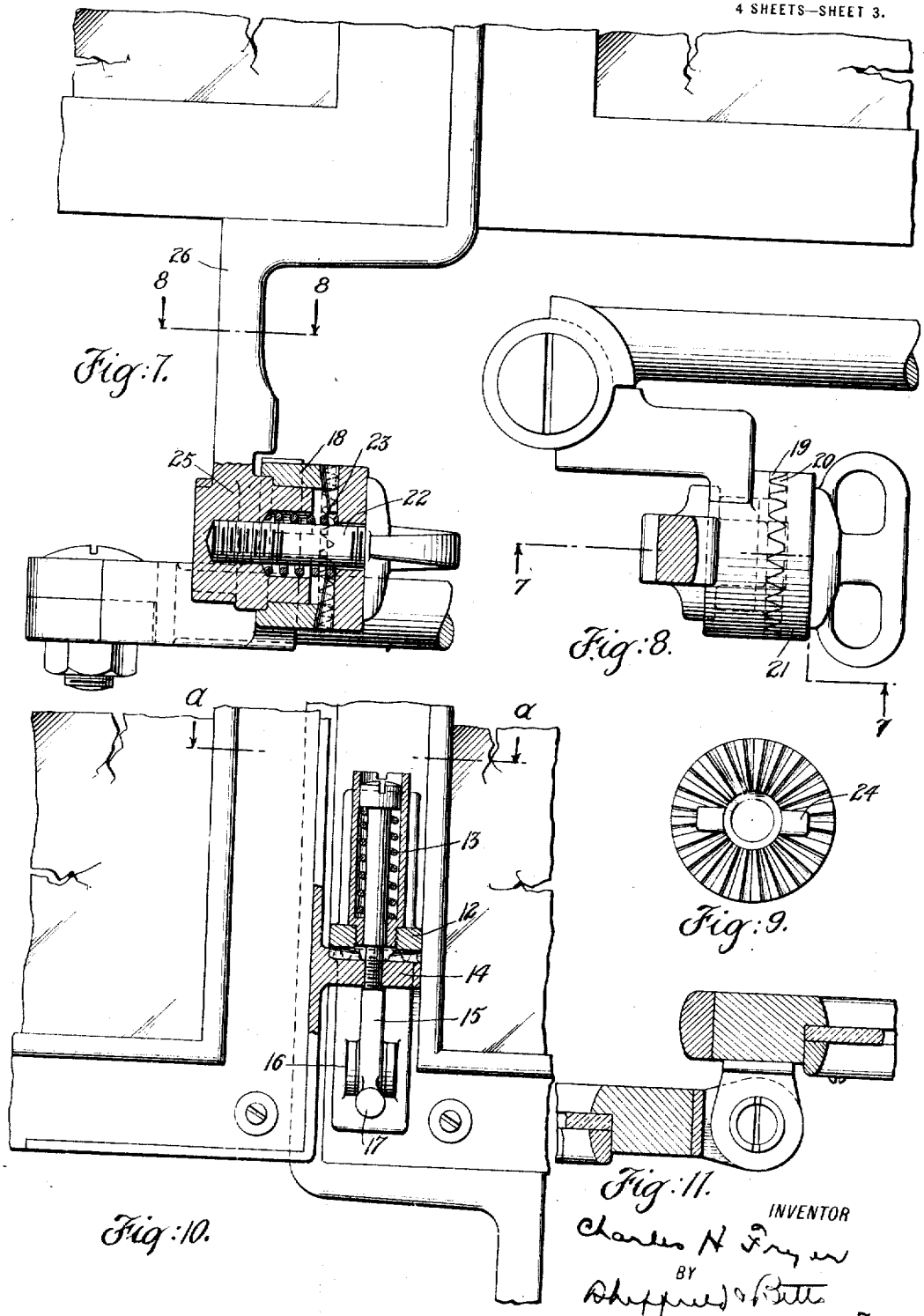

C. H. FRYER.
WIND SHIELD FOR AUTOMOBILES AND OTHER PASSENGER VEHICLES.
APPLICATION FILED OCT. 16, 1916.

1,274,869.

Patented Aug. 6, 1918.
4 SHEETS—SHEET 4.

INVENTOR
Charles H. Fryer
BY
Sheffield & Betts
ATTORNEYS

UNITED STATES PATENT OFFICE.

CHARLES HAL. FRYER, OF PROVIDENCE, RHODE ISLAND.

WIND-SHIELD FOR AUTOMOBILES AND OTHER PASSENGER-VEHICLES.

1,274,869.      Specification of Letters Patent.      Patented Aug. 6, 1918.

Application filed October 16, 1916. Serial No. 125,839.

*To all whom it may concern:*

Be it known that I, CHARLES H. FRYER, a subject of the King of Great Britain, residing at Providence, in the State of Rhode Island, have invented certain new and useful Improvements in Wind-Shields for Automobiles and other Passenger-Vehicles, of which the following is a full, clear, and complete disclosure.

My invention relates to wind shields for use on automobiles and other open vehicles, and principally to wind shields employed in connection with the rear seats.

The objects of my invention are to provide a device of this kind that will give the maximum protection to passengers, that can be readily adjusted into different operative positions, that can be readily adjusted so that it will not obstruct the passageway between the front and rear seats of the vehicle, that can be readily swung out of operative position and out of the way of the passengers when it is not desired to use it.

Other objects and advantages of my invention will be readily understood from a description of the preferred embodiment thereof shown in the drawing accompanying and forming a part of this specification, and which shows the device used in connection with the rear seat of an open automobile body.

Referring to the drawings: Figure 1 shows the complete device in position in front of the rear seat of an automobile. Fig. 2 is an enlarged plan view of the wind shield shown in Fig. 1. Fig. 3 is a rear view of two of the adjustable sections forming a part of the wind shield. Figs. 4, 5 and 6 are detailed views showing the means employed for hinging the adjacent sections of the wind shield to each other and for supporting them on the automobile. Figs. 7, 8 and 9 are detail views showing the hinge joints employed to support the sections at the outer ends of the horizontal supporting arms. Fig. 7 is a view taken on line 7—7 of Fig. 8; Fig. 8 is a sectional view taken on line 8—8 of Fig. 7. Fig. 10 is a detail view showing the means employed to hinge the adjacent sections to each other. Fig. 11 is a sectional view taken on the line *a—a* of Fig. 10. Figs. 12, 13, 14 and 15 are diagramic views showing the way the different elements of the wind shield are manipulated, in order to bring them into the operative position shown in Fig. 12, or the folded-down inoperative position shown in Fig. 15.

Referring in detail to the drawing: the shield proper is made of four sections—1, 2, 3 and 4, and these are arranged in pairs; thus, sections 1 and 2 are hinged together at their adjacent edges by hinge members 6, as are also sections 3 and 4. Each pair of sections thus constitutes a separate element and are supported by a swinging arm 8. These swinging arms 8 are pivoted at one end to vertical supports 9, secured to the side wall of the car immediately in front of the rear seat, and are arranged to swing in a horizontal plane. The short arms, or extensions 10, are hinged to the outer end of arms 8 and terminate in hinge joints 11, adapted to move in a vertical plane and to be locked in any desired position. The sections 2 and 3 are mounted on one member of these hinge joints 11 so that they may swing in a vertical plane, carrying with them, of course, the sections 1 and 4. The hinges 6 are formed of a toothed member 12 (see Fig. 10) held by a spring 13 in contact with the toothed member 14. This form of hinge permits the sections to be adjusted and held in any desired position. They may be firmly locked in position by means of the detent 15, which when thrown into operative position (as shown in Fig. 5) prevents the members 12 and 14 from separating, that is: it prevents one member from rising and riding over the other. This detent 15 is pivoted at 16 and may be thrown out of operative position by pressing on the handle 17.

The hinge 11 is also of the toothed variety. Thus it includes the member 18, having projecting teeth 19 on its face adapted to coöperate with teeth 20 on the locking member 21. The member 21 may be forced in by screw 22 and on releasing this screw 22, it is forced outwardly by spring 23. It is provided on its face with lugs 24 which enter corresponding recesses in the end 25 of the arm 26 which supports the wind shield section. The arrangement is such, therefore, that when screw 22 is forced in it carries with it the member 21 and the teeth on this member engage the corresponding teeth on the member 18, and the hinge is then in a locked position.

Figure 13:
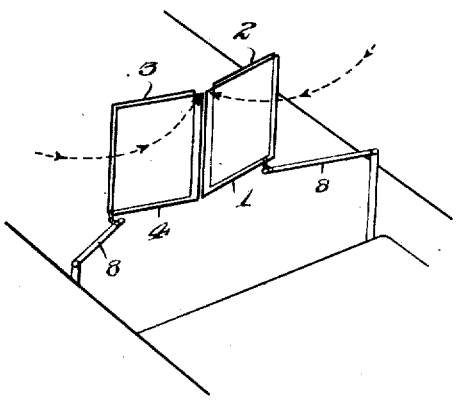
Figure 14:
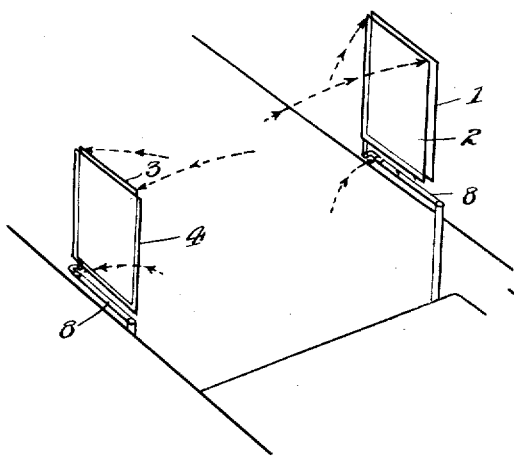
Figure 15:
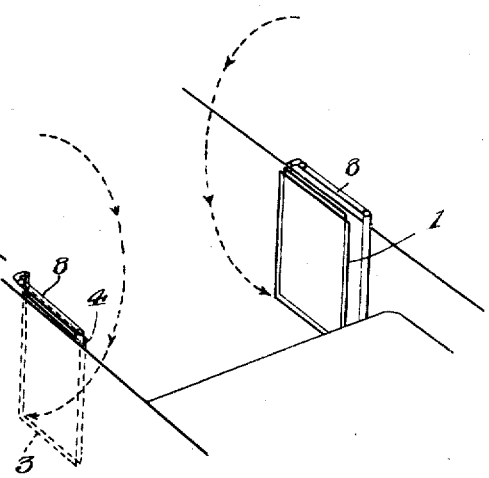

The wind shield sections, when not in use, are carried in the position shown diagramically in Fig. 15. In order to bring them into this position from the operative positions shown in Figs. 1 and 2, the following operations are necessary:

The latch 27 which normally holds the sections 2 and 3 together at their outer edges is released, section 1 is folded on section 2, and section 4 on section 3, as shown in Fig. 13; then the arms 8 are swung forward until they are substantially in line with the upper edge of plate rail of the automobile body, and the sections are then brought into position as shown in Fig. 14. Next, they are folded down against the inner sides of the body immediately in front of the rear seats, as shown in Fig. 15.

The wind shield, as shown in the drawing, and as used in practice, is preferably provided with an apron 29. This apron is preferably made in two parts which may be joined together at the center edge by the clasps 30. Half of the divided curtain is secured to the sections 1 and 2 and the other half to the sections 3 and 4. These apron sections remain on the wind shield when folded away, assuming the position shown in Fig. 6.

It will be seen from the foregoing that not only can the wind shield be readily removed from operative to inoperative positions, but the sections 2 and 3 can be readily separated so as to permit the passengers in the automobile to pass from the front seats to the rear seats; also, the side sections 1 and 4 may be readily adjusted to any desired angle.

While I have described the device as being particularly adapted for automobiles having divided front seats, it will be obvious to those skilled in the art that it is adapted to other types of automobile bodies, and that it also may be used in motor boats and other vehicles; also, while I have described only the preferred embodiment of my invention, it is obvious that changes may be made therein by those skilled in the art, without departing from the scope of my claims.

What I claim is:

1. In a wind shield of the kind described, a horizontally disposed arm pivotally supported on the side wall of a vehicle body intermediate the front and rear seats thereof, and adapted to swing in a substantially horizontal plane, and a wind shield element mounted upon said arm and adapted to swing with relation thereto about a substantially vertical axis and about a substantially horizontal axis, whereby each wind shield element may be placed in an elevated transverse position adjacent the longitudinal center of the vehicle body, or in a depressed longitudinal position adjacent the side wall of the vehicle body.

2. In a wind shield of the kind described, an independent horizontally disposed arm pivotally supported upon each side wall of a vehicle body, intermediate the front and rear seats thereof, and adapted to swing in a substantially horizontal plane, a wind shield element mounted upon each arm and adapted to swing with relation thereto about a substantially vertical axis and about a substantially horizontal axis, whereby each wind shield element may be placed in an elevated transverse position adjacent the longitudinal center of the vehicle body, or in a depressed longitudinal position adjacent the side wall of the vehicle body, and means for connecting the two wind shield elements when in the first mentioned position.

3. In a wind shield of the kind described, a horizontally disposed arm pivotally supported upon the side wall of the vehicle body intermediate the front and rear seats thereof, and adapted to swing in a substantially horizontal plane, a wind shield element mounted upon said arm and adapted to swing with relation thereto about a substantially vertical axis and about a substantially horizontal axis, whereby said wind shield element may be placed in an elevated transverse position adjacent the longitudinal center of the vehicle body, or in a depressed longitudinal position against the side wall of the vehicle body, and an additional wind shield section hingedly connected to said wind shield element and adapted to form an extension thereof when the element is in the first mentioned position, and to be folded thereagainst when the element is in the last mentioned position.

4. The combination with a car having a rear seat and a side door opening forward of said seat, of an arm pivoted to the side of the car to swing in a horizontal plane, said arm being of substantial length as compared with the length of the car being arranged to lie parallel to the side of the car between said pivot and said door when desired, a shield member at the outer end of said arm and connections between said arm and member whereby said member may be swung both in a horizontal plane and in a vertical plane to fold the shield against the inner wall of the car when desired.

5. The combination with a car having a rear seat and a side door opening forward of said seat, of an arm pivoted to the side of the car to swing in a horizontal plane, said arm being of substantial length as compared to the width of the car being arranged to lie parallel to the side of the car body between said pivot and said door when desired, a shield member at the outer end of said arm, connections between said arm and said member whereby said member may be swung both in a horizontal plane and in a vertical plane to fold the member against the inner wall of the car when desired, said connections including a short extension pivoted to said arm to swing in a horizontal plane through an arc of approximately 180 degrees about the outer end of the arm, and a hinge for said shield member at the outer end of said extension arranged to permit said member to swing about a substantially horizontal axis.

6. In a device of the class described, a shield member, an arm pivoted to the car body to swing in a horizontal plane; said arm being of substantial length as compared to the width of the car providing the sole support of said member, and mounting means intermediate said arm and said shield member permitting said member to pivot in both the vertical and horizontal planes.

7. In a device of the kind described, a shield member, an arm pivoted to the car body to swing in a horizontal plane, said arm being of substantial length as compared to the width of the car providing the sole support of said member, and mounting means intermediate said arm and said shield member permitting said member to pivot in both the vertical and horizontal planes, said arm being on a lower level than said shield member when the latter is in active use.

8. The combination with a car body of a horizontally disposed arm pivotally supported on the side wall of said body and adapted to swing in a substantially horizontal plane, said arm being of substantial length as compared to the width of the car, a wind shield element pivoted on the outer end of said arm to swing with relation thereto about a substantially vertical axis, a hinge intermediate said element and arm permitting said element to swing about a substantially horizontal axis, and means associated with said hinge whereby said element may be locked in adjusted position.

9. In a wind shield of the kind described, a horizontally disposed arm pivotally supported upon the side wall of the vehicle body intermediate the front and rear seats thereof, and arranged to swing in a substantially horizontal plane, and a pair of wind shield elements being mounted upon said arm and arranged to swing with relation thereto about a common substantially vertical axis and about a common substantially horizontal axis, said elements being independently rotatable about said vertical axis.

CHARLES HAL. FRYER.